(12) United States Patent
Kobayashi (10) Patent No.: US 10,630,859 B2
(45) Date of Patent: Apr. 21, 2020

(54) IMAGE FORMING APPARATUS

(71) Applicant: CANON KABUSHIKI KAISHA, Tokyo (JP)

(72) Inventor: Keita Kobayashi, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/506,338

(22) Filed: Jul. 9, 2019

(65) Prior Publication Data

US 2020/0021709 A1   Jan. 16, 2020

(30) Foreign Application Priority Data

Jul. 10, 2018  (JP) ................................. 2018-130941

(51) Int. Cl.
*G03G 21/20* (2006.01)
*H04N 1/00* (2006.01)
*G01K 13/00* (2006.01)

(52) U.S. Cl.
CPC ..... *H04N 1/00992* (2013.01); *H04N 1/00891* (2013.01); *G01K 13/00* (2013.01); *H04N 1/00981* (2013.01); *H04N 1/00986* (2013.01)

(58) Field of Classification Search
CPC .......... H04N 1/00992; H04N 1/00986; H04N 1/00981; H04N 1/00891; G01K 13/00
See application file for complete search history.

(56) References Cited

U.S. PATENT DOCUMENTS

2017/0064123 A1* 3/2017 Ito ........................ G06K 15/408
2018/0027140 A1* 1/2018 Ikeda ................. H04N 1/00925
                                                                     358/1.14

FOREIGN PATENT DOCUMENTS

JP        2009-265431 A    11/2009

* cited by examiner

*Primary Examiner* — Hoang X Ngo
(74) *Attorney, Agent, or Firm* — Venable LLP (57) ABSTRACT

An image forming apparatus includes a temperature detecting unit configured to detect a temperature outside the image forming apparatus, a storage portion, and a control unit configured to execute a dew condensation eliminating operation for eliminating dew condensation in the image forming apparatus based on a detection result of the temperature detecting unit. The control unit stores, in the storage portion, an execution time of the dew condensation eliminating operation executed when a power supply to the image forming apparatus is stopped during the dew condensation eliminating operation and determines, when the power supply to the image forming apparatus is started, whether or not to execute the dew condensation eliminating operation based on the execution time and a power supply stop continuing time from when the power supply is stopped to when the power supply is started.

8 Claims, 9 Drawing Sheets

FIG. 9D

IMAGE FORMING APPARATUS

BACKGROUND OF THE INVENTION

Field of the Invention

The present invention relates to an image forming apparatus configured to execute a dew condensation eliminating operation.

Description of the Related Art

In an image forming apparatus placed in a room where the temperature is extremely low as on a winter morning, an inner temperature of the image forming apparatus also decreases as an ambient temperature around the image forming apparatus decreases. When an outside air temperature is rapidly increased by a heater under a state in which the inner temperature of the image forming apparatus has decreased, warmed air flows into the image forming apparatus. The warmed air comes into contact with an extremely cold member, such as a photosensitive drum or a polygon mirror of an exposing device, and is cooled by the member. Rapid cooling of the warmed air by the extremely cold member causes a temperature change, and the temperature change in turn changes an amount of saturated vapor. Consequently, dew condensation occurs to result in water drop deposition on a surface of the member. When the dew condensation occurs on the photosensitive drum or the polygon mirror, a step of forming an electrostatic latent image on the photosensitive drum through use of a laser beam is interrupted by the dew condensation, resulting in a problem of defective image formation. To prevent the problem, in Japanese Patent Application Laid-Open No. 2009-265431, there is disclosed an approach in which, when an image forming apparatus is in a sleep mode, the image forming apparatus is periodically activated to monitor a temperature and detect whether or not dew condensation has occurred. When dew condensation has occurred, an aging operation is performed in the image forming apparatus to promptly eliminate the dew condensation.

When a temperature outside an apparatus is periodically detected during a sleep mode period to determine whether or not dew condensation has occurred as disclosed in Japanese Patent Application Laid-Open No. 2009-265431, it is required to maintain a power supply to an image forming apparatus in an ON state. However, in a case in which a print job cannot be performed due to an occurrence of an aging operation when, for example, a user returns the image forming apparatus from a sleep mode to a normal mode to perform the print job, the user may turn OFF the power supply during the aging operation. Afterwards, a state of dew condensation cannot be determined immediately after the power supply is turned ON, and therefore whether or not the aging operation is to be continued cannot be determined. Thus, the related art has a problem in that, depending on a power status in the image forming apparatus, a state of dew condensation cannot be correctly determined and the aging operation cannot be normally performed.

SUMMARY OF THE INVENTION

According to an embodiment of the present invention, there is provided an image forming apparatus comprising:
an image forming portion configured to form an image on a recording medium;
a temperature detecting unit configured to detect a temperature outside the image forming apparatus;
a nonvolatile storage portion configured to store data; and
a control unit configured to perform control to execute a dew condensation eliminating operation for eliminating dew condensation which has occurred in an interior of the image forming apparatus based on a detection result of the temperature detecting unit,
wherein, when a power supply to the image forming apparatus is stopped during an execution of the dew condensation eliminating operation, the control unit stores an execution time of the dew condensation eliminating operation which has been executed when the power supply is stopped in the nonvolatile storage portion, and
wherein, when the power supply to the image forming apparatus is started after the power supply to the image forming apparatus is stopped during the execution of the dew condensation eliminating operation, the control unit determines whether or not to execute the dew condensation eliminating operation based on the execution time and a power supply stop continuing time from a time when the power supply to the image forming apparatus is stopped during the execution of the dew condensation eliminating operation to a time when the power supply to the image forming apparatus is started.

Further features of the present invention will become apparent from the following description of exemplary embodiments with reference to the attached drawings.

DESCRIPTION OF THE EMBODIMENTS (Image Forming Apparatus)

Figure 1:
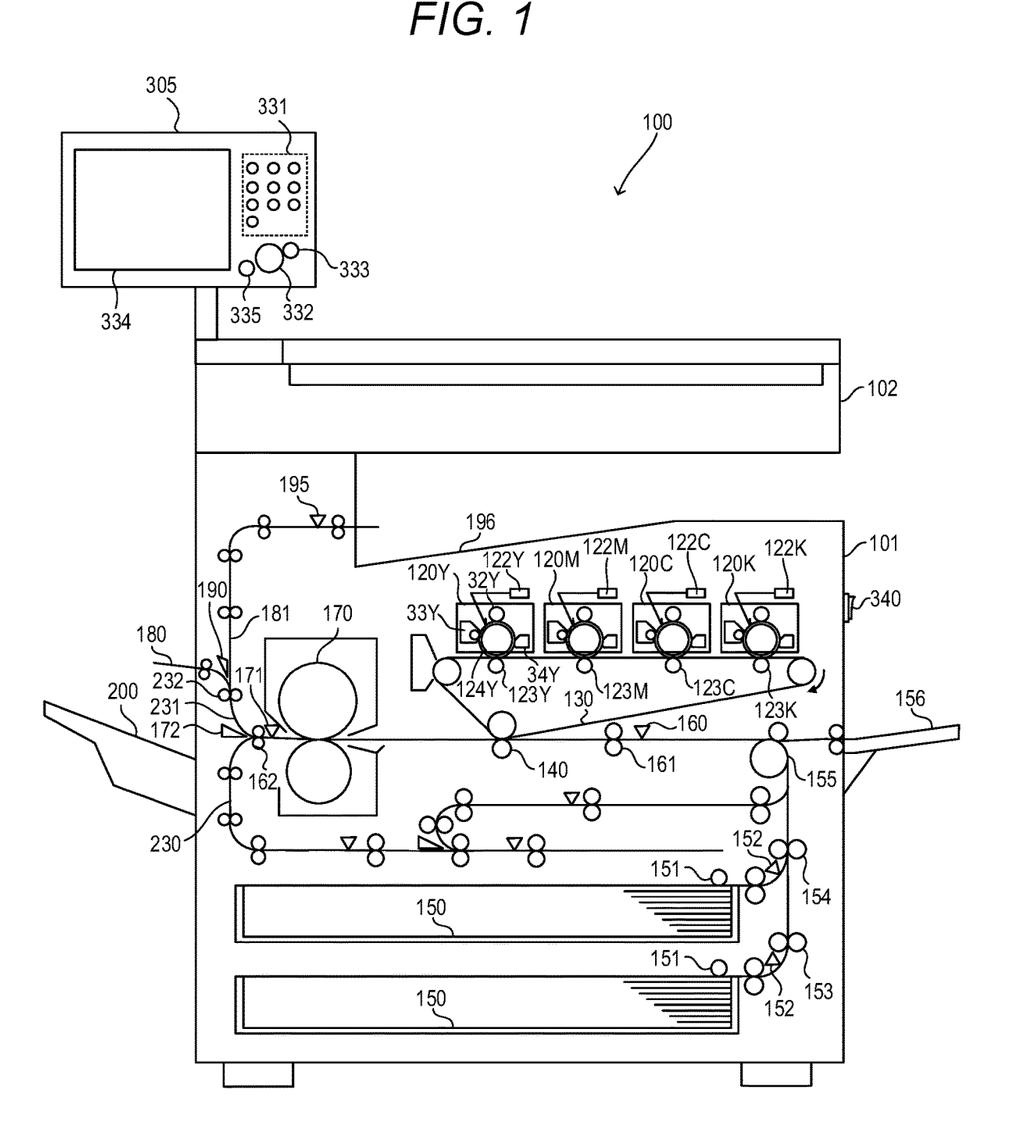
FIG. 1 is a cross-sectional view of an image forming apparatus.
Figure 2:
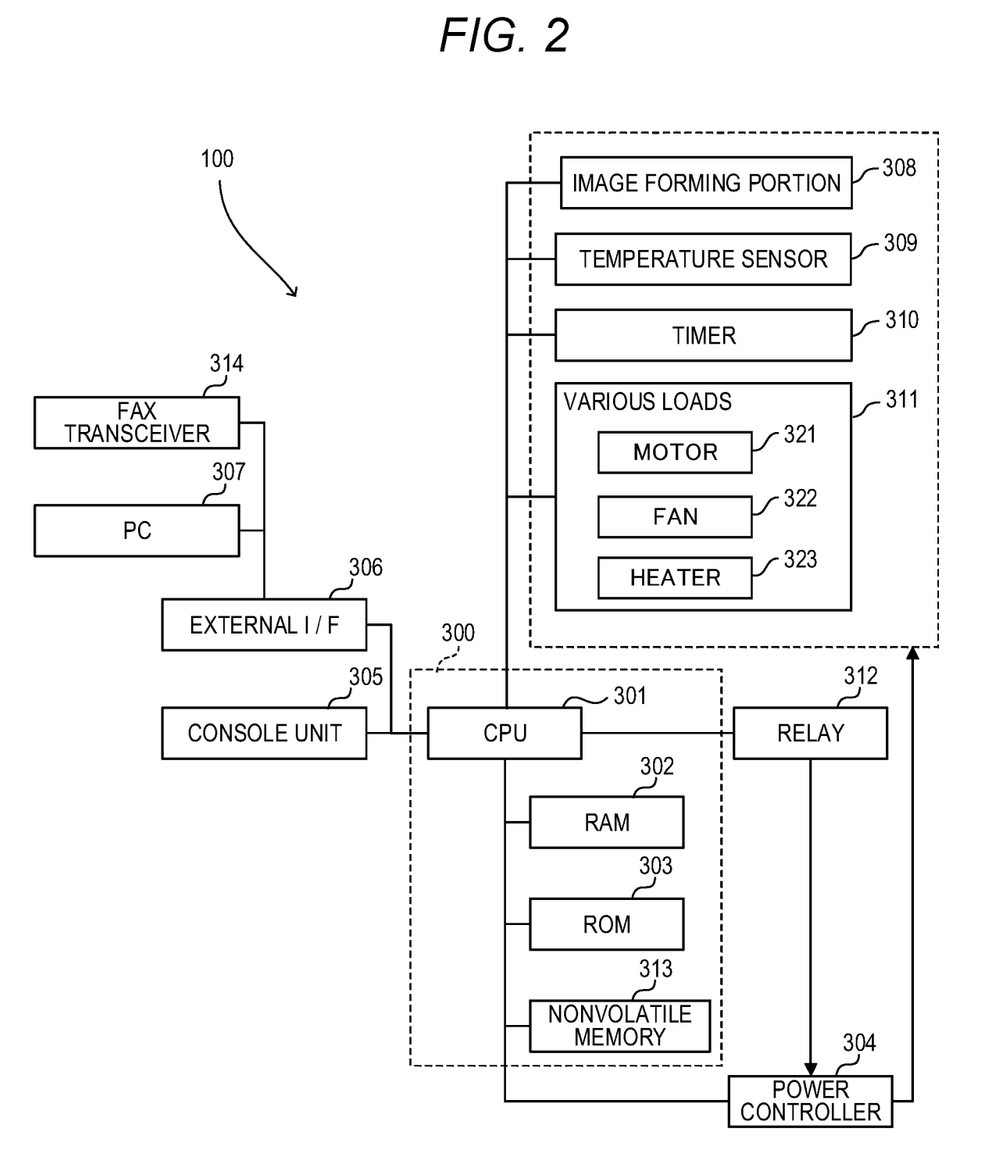
FIG. 2 is a block diagram of a control system of the image forming apparatus.

FIG. 1 is a cross-sectional view of an image forming apparatus 100. FIG. 2 is a block diagram of a control system 110 of the image forming apparatus 100. Referring to FIG. 1 and FIG. 2, a configuration of the image forming apparatus 100 is described. The image forming apparatus 100 forms an image on a paper sheet serving as a recording medium by an image formation method such as an electrophotographic method or an electrostatic recording method. As illustrated in FIG. 2, a control portion (controller) 300 includes a central processing unit (CPU) 301 serving as a control unit, a random access memory (RAM) 302, a read only memory (ROM) 303, and a nonvolatile memory (storage portion) 313. The ROM 303 stores therein a control program for the image forming apparatus 100. The nonvolatile memory 313 is capable of retaining data even after a power supply to the CPU 301 is stopped. The nonvolatile memory 313 stores therein data to be continuously used even after a power supply is turned OFF/ON among the data stored in the RAM 302.

The CPU 301 is electrically connected to an image forming portion 308 and various loads 311. The various loads 311 include a motor 321, a fan (air blower) 322, and a heater 323. The CPU 301 is electrically connected to a console unit 305 serving as an instruction/display unit. As illustrated in FIG. 1, the console unit 305 includes an input key group 331 to be used by a user when inputting information and a start key 332 to be pressed by the user to start an image forming operation. The console unit 305 also includes a stop key 333 to be pressed by the user to interrupt the image forming operation and a display portion (touch panel) 334 as serving a display unit. The user can give, to the CPU 301 via the console unit 305, a request for an intended operation such as print job execution or power operation. The CPU 301 can be connected to a PC 307 or to a FAX transceiver 314 serving as a facsimile transmitting and receiving unit via an external I/F 306 serving as an interface with an external device. The CPU 301 receives, from the console unit 305 or the PC 307, an instruction to start a printing operation or an instruction to perform an operation of returning from a sleep mode, and starts the operation. For example, when the user gives an instruction to start the printing operation via the PC 307, the CPU 301 controls driving of the image forming portion 308 and the various loads 311.

The CPU 301 is electrically connected to each of a temperature sensor 309 and a timer (timing device) 310, which are mounted on a circuit substrate. The temperature sensor 309 is a temperature detecting unit configured to detect a temperature outside the image forming apparatus 100. The timer 310 is a time obtaining unit configured to obtain a current time Tc. As the temperature detecting unit, instead of the temperature sensor 309 mounted on the circuit substrate, for example, a temperature information obtaining unit configured to obtain temperature information via the console unit 305 or the external I/F may also be used. As the time obtaining unit, instead of the timer 310, for example, a time information obtaining unit configured to obtain time information or elapsed time information via the console unit 305 or the external I/F may also be used.

The CPU 301 controls the image forming portion 308. The image forming portion 308 includes cartridges 120Y, 120M, 120C, and 120K, an intermediate transfer belt (intermediate transfer member) 130, and primary transfer portions (primary transfer rollers) 123Y, 123M, 123C, and 123K, which are illustrated in FIG. 1. The image forming portion 308 further includes a secondary transfer portion (secondary transfer rollers) 140 and laser scanners (exposing devices) 122Y, 122M, 122C, and 122K. The CPU 301 is electrically connected to a power controller 304 to be supplied with electric power from the power controller 304. The CPU 301 controls the power controller 304 so as to supply required electric power to the image forming portion 308, the temperature sensor 309, the timer 310, and the various loads 311 of the image forming apparatus 100. The CPU 301 is electrically connected to a relay 312. The CPU 301 controls the relay 312 in accordance with a power system in use to allow electric power to be selectively supplied or interrupted.

The cartridges 120Y, 120M, 120C, and 120K are removably attached to a main body 101 of the image forming apparatus 100. The cartridges 120Y, 120M, 120C, and 120K are configured to form yellow (Y), magenta (M), cyan (C), and black (K) toner images, respectively. Each of the cartridges 120Y, 120M, 120C, and 120K has the same structure, and hence description is given of the cartridge 120Y. The cartridge 120Y includes a rotating photosensitive member (photosensitive drum) 124Y. Around the photosensitive member 124Y, a charging roller (charging member) 32Y, a developing device 33Y, and a photosensitive member cleaner 34Y are provided. The developing device 33Y includes a toner container configured to contain therein a yellow toner and a developing roller (developing member). The photosensitive cleaner 34Y includes a cleaning blade configured to scrape off the toner remaining on the photosensitive member 124Y.

<Image Forming Operation>

Next, referring to FIG. 1 and FIG. 2, the image forming operation in the image forming apparatus 100 is described. When the user executes a print job via the PC 307 connected to the external I/F 306, and a printing operation start instruction is given to the CPU 301, the CPU 301 starts to feed paper sheets from feeding cassettes 150 or a manual feed tray 156. By the rotation of the motor 321 serving as a drive source for pickup rollers 151, the pickup rollers 151 are rotated to allow each of the paper sheets to be fed from the feeding cassette 150 on a one-by-one basis. At this time, whether or not the operation of feeding the paper sheet is normally performed is monitored through use of a pickup sensor 152.

The CPU 301 starts the image forming operation through use of the cartridges 120Y, 120M, 120C, and 120K in time for arrival of the paper sheet at the secondary transfer portion 140. After a surface of the photosensitive member 124Y is charged by the charging roller 32Y, a laser beam (light beam) emitted from the laser scanner 122Y forms an electrostatic latent image on the surface of the photosensitive member 124Y. The electrostatic latent image is developed with a yellow toner by the developing device 33Y, and a yellow toner image is formed on the photosensitive member 124Y. To the yellow toner image on the photosensitive member 124Y, a primary transfer voltage is applied by the primary transfer portion 123Y to transfer the yellow toner image onto the intermediate transfer belt 130. Likewise, by the cartridges 120M, 120C, and 120K, a magenta toner image, a cyan toner image, and a black toner image are formed and transferred by the primary transfer portions 123M, 123C, and 123K, respectively, onto the intermediate transfer belt 130. The toner images transferred onto the intermediate transfer belt 130 are delivered by the rotation of the intermediate transfer belt 130 to the secondary transfer portion 140.

The paper sheets fed from the feeding cassettes 150 are conveyed by conveying rollers 153, 154, and 155 to registration rollers 161. The CPU 301 monitors a registration sensor 160 to detect a position of each of the conveyed paper sheets. The CPU 301 controls the conveyance of the paper sheet based on a time when a leading end of the paper sheet reaches the registration sensor 160 such that, in the secondary transfer portion 140, the leading end of the paper sheet is matched with respective leading ends of the toner images on the intermediate transfer belt 130. For example, when the CPU 301 determines that the paper sheet reaches the secondary transfer portion 140 earlier than the toner images, the CPU 301 stops the paper sheet through use of the registration rollers 161. Then, the CPU 301 resumes the rotation of the registration rollers 161 to convey the paper sheet such that the leading end of the paper sheet is matched with the leading ends of the toner images in the secondary transfer portion 140. The CPU 301 applies a secondary transfer voltage to the secondary transfer portion 140 to transfer the toner images onto the paper sheet.

The paper sheet having the toner images transferred thereon is conveyed to a fixing device 170. The fixing device 170 thermally fixes the toner images onto the paper sheet to form an image on the paper sheet. When the leading end of the paper sheet having the image formed thereon reaches a conveyance sensor 171, the CPU 301 switches positions of a flapper 172 and a flapper 190 based on the details of a job specified in advance from the console unit 305 or the PC 307 connected thereto via the external OF 306 to change a conveyance path. Specifically, when double-sided printing is specified in the input print job, the CPU 301 changes a position of the flapper 172 to convey the paper sheet to a conveyance path 230. In a single-sided print job, when the paper sheet is to be delivered to a delivery tray 200 with a printing surface thereof facing downward, the CPU 301 changes the position of the flapper 172 to temporarily convey the paper sheet to the conveyance path 230. Then, the CPU 301 turns over the paper sheet, conveys the paper sheet to a conveyance path 231, and changes a position of the flapper 190 to deliver the paper sheet from a conveyance path 180 to the delivery tray 200. When the paper sheet is delivered to a delivery tray 196 in single-sided printing or double-sided printing, the CPU 301 changes the position of the flapper 172 to convey the paper sheet to the conveyance path 231. In the input print job, when delivery of the paper sheet to the delivery tray 200 is set, the CPU 301 switches the positions of the flapper 172 and the flapper 190 to convey the paper sheet to the conveyance path 180.

The paper sheet conveyed to the conveyance path 231 is further conveyed by conveying rollers 232 to a downstream side in a direction of conveyance of the paper sheet. Based on the details of the job, the position of the flapper 190 is changed, and the paper sheet is conveyed to the conveyance path 180 or the conveyance path 181. When a destination of the paper sheet to be delivered, which is specified in the print job, is the delivery tray 200, the paper sheet is conveyed to the conveyance path 180 and delivered to the delivery tray 200. When the destination of the paper sheet to be delivered, which is specified by the user, is the delivery tray 196, the paper sheet is conveyed to the conveyance path 181 and delivered to the delivery tray 196. The image forming operation described above is exemplary, and the present invention is not limited thereto.

<Power Controlling Operation>

Figure 3:
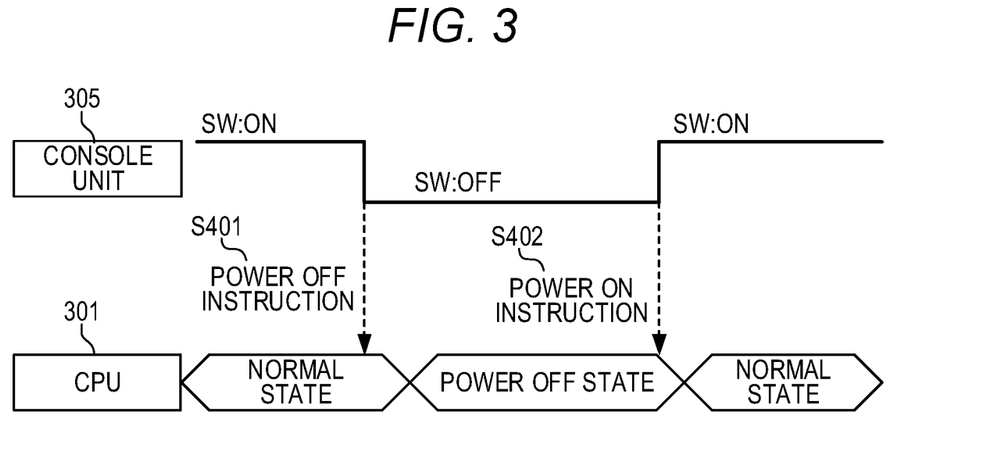
FIG. 3 is an explanatory diagram of a power controlling operation in which a power supply to the image forming apparatus is turned ON/OFF.

Next, referring to FIG. 3, a power controlling operation is described. FIG. 3 is an explanatory diagram of the power controlling operation in which the power supply to the image forming apparatus 100 is turned OFF/ON. In FIG. 3, there are illustrated an ON/OFF state of a power switch 335 of the console unit 305 and a normal state/power OFF state of the CPU 301. The normal state of the CPU 301 indicates a state in which the power switch 335 is turned ON and the image forming apparatus 100 is energized. The power OFF state of the CPU 301 indicates a state in which the power switch 335 is turned OFF and the image forming apparatus 100 is stopped. A switch to be used to turn ON/OFF the power supply to the image forming apparatus 100 is not limited to the power switch 335 of the console unit 305. The power supply to the image forming apparatus 100 is turned ON/OFF by the turning ON/OFF of a switch displayed on the display portion 334 or a power switch 340 provided in the main body 101 of the image forming apparatus 100.

The CPU 301 polls a state of an input signal from the console unit 305 to determine a power status of the CPU 301. When the power switch 335 is in an ON state, the CPU 301 is in a normal state. When detecting that the input signal from the console unit 305 to the CPU 301 is changed from the ON state to an OFF state by an operation performed by the user (Step S401), the CPU 301 operates the power controller 304 before a transition to the power OFF state. The CPU 301 operates the power controller 304 to stop a power supply to the image forming apparatus 100 except for the CPU 301. When the stopping of the power supply to the image forming apparatus 100 except for the CPU 301 is completed, the CPU 301 stops the power supply to the CPU 301 and shifts to the power OFF state. Subsequently, when the input signal from the console unit 305 is changed from the OFF state to the ON state by an operation performed by the user (Step S402), the power supply to the CPU 301 is resumed. When the power supply to the CPU 301 is started, the CPU 301 operates the power controller 304 to start the power supply to the entire image forming apparatus 100 and shifts to the normal state.

<Controlling Operation for Image Forming Apparatus>

Figure 4:
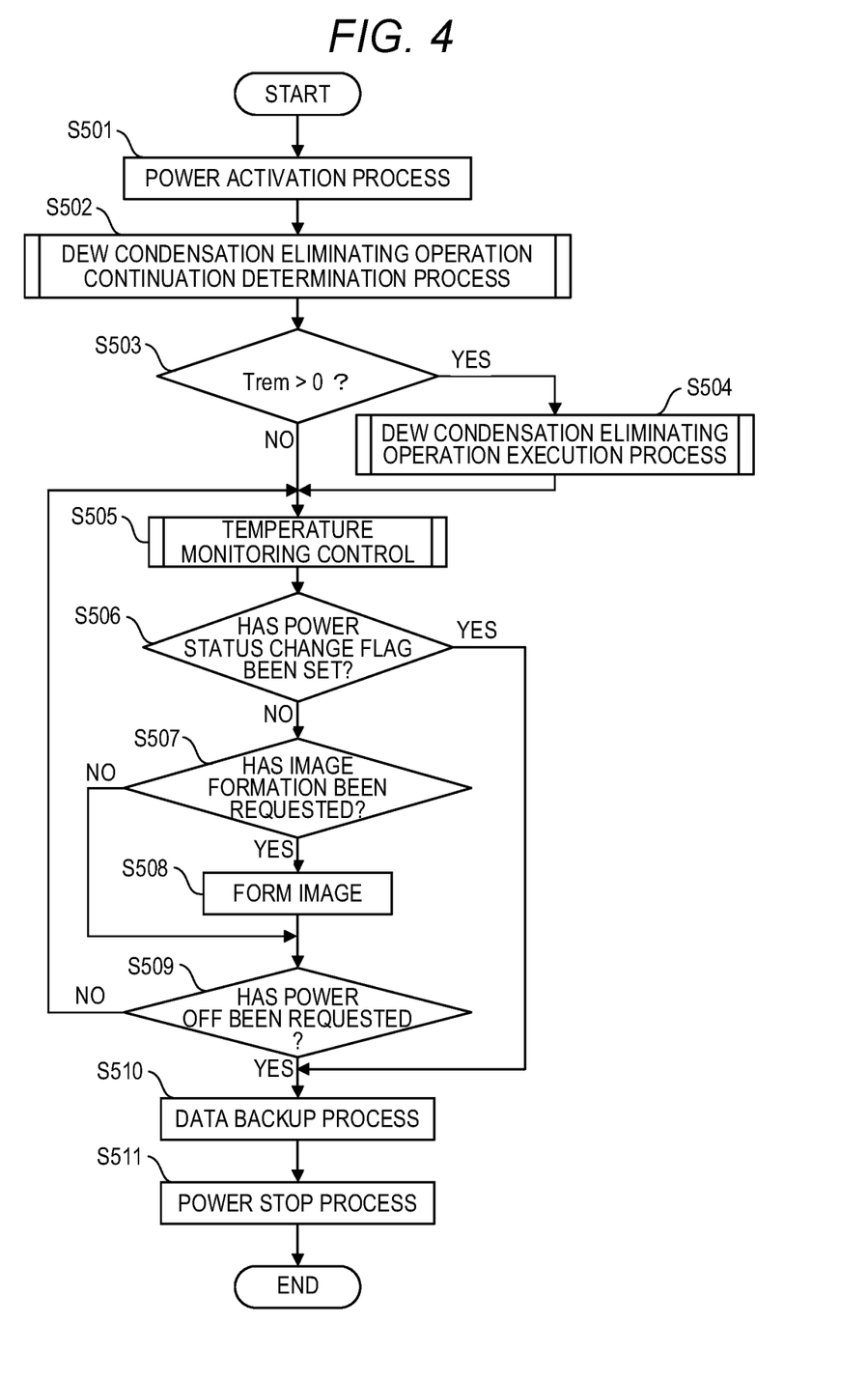
FIG. 4 is a flow chart of a controlling operation for the image forming apparatus, which is executed by a CPU.

In the following, description is given of a controlling operation for the image forming apparatus 100, which is executed by the CPU 301. FIG. 4 is a flow chart of the controlling operation for the image forming apparatus 100, which is executed by the CPU 301. The CPU 301 executes the controlling operation based on a program stored in the ROM 303. When the CPU 301 is energized to start the controlling operation, the CPU 301 executes a power activation process to start a power supply to the entire image forming apparatus 100 (Step S501). When power activation is completed, the CPU 301 executes a dew condensation eliminating operation continuation determination process (Step S502). The details of the dew condensation eliminating operation continuation determination process are described later. The CPU 301 determines whether or not a dew condensation eliminating operation remaining time Trem determined by the dew condensation eliminating operation continuation determination process is longer than 0 (Step S503). When the dew condensation eliminating operation remaining time Trem is longer than 0, it is required to continue the dew condensation eliminating operation. Accordingly, when the dew condensation eliminating operation remaining time Trem is longer than 0 (YES in Step S503), the CPU 301 performs a dew condensation eliminating operation execution process (Step S504). The details of the dew condensation eliminating operation execution process are described later. When the dew condensation eliminating operation execution process is ended, the CPU 301 advances the process of the controlling operation to Step S505. When the dew condensation eliminating operation remaining time Trem is equal to or less than 0 (NO in Step S503), the CPU 301 executes temperature monitoring control (Step S505). The details of the temperature monitoring control are described later.

The CPU 301 determines whether or not a power status change flag has been set (Step S506). The power status change flag represents that the power supply is required to be turned OFF due to a change in a power status during the dew condensation eliminating operation. The power status change flag is described in the dew condensation eliminating operation execution process described later. When the power status change flag has not been set (NO in Step S506), the CPU 301 determines whether or not image formation has been requested (Step S507). When the image formation has been requested (YES in S507), the CPU 301 controls the image forming portion 308 and the various loads 311 to perform the image formation (Step S508). After the image formation is ended, the CPU 301 advances the process of the controlling operation to Step S509. When the image formation has not been requested (NO in Step S507), the CPU 301 determines whether or not power OFF has been requested via the console unit 305 (Step S509). When the power OFF has not been requested (NO in Step S509), the CPU 301 returns the process of the controlling operation to Step S505. Meanwhile, when the power OFF has been requested (YES in Step S509), the CPU 301 advances the process of the controlling operation to Step S510.

When the power status change flag has been set (YES in Step S506), the CPU 301 executes a data backup process, in which data required when the power supply is turned ON next time is stored in the nonvolatile memory 313 (Step S510). The CPU 301 stores, in the nonvolatile memory 313, an operation status of the dew condensation eliminating operation such as "Dew condensation eliminating operation is in progress" representing that the dew condensation eliminating operation is currently executed or "Dew condensation eliminating operation is stopped" representing that the dew condensation eliminating operation is currently stopped. The CPU 301 stores, in the nonvolatile memory 313, a stop time obtained from the timer 310 immediately before the power supply to the CPU 301 is stopped as "time Toff before power off". The CPU 301 stores "dew condensation eliminating operation continuing time T2" in the nonvolatile memory 313 immediately before the power supply to the CPU 301 is stopped. The dew condensation eliminating operation continuing time T2 is calculated by the CPU 301 based on a start time obtained from the timer 310 when the dew condensation eliminating operation is started and on the stop time obtained from the timer 310 immediately before the power supply is stopped. Subsequently, the CPU 301 executes a power stop process based on the power controlling operation described with reference to FIG. 3 (Step S511), and ends the controlling operation.

Figure 5:
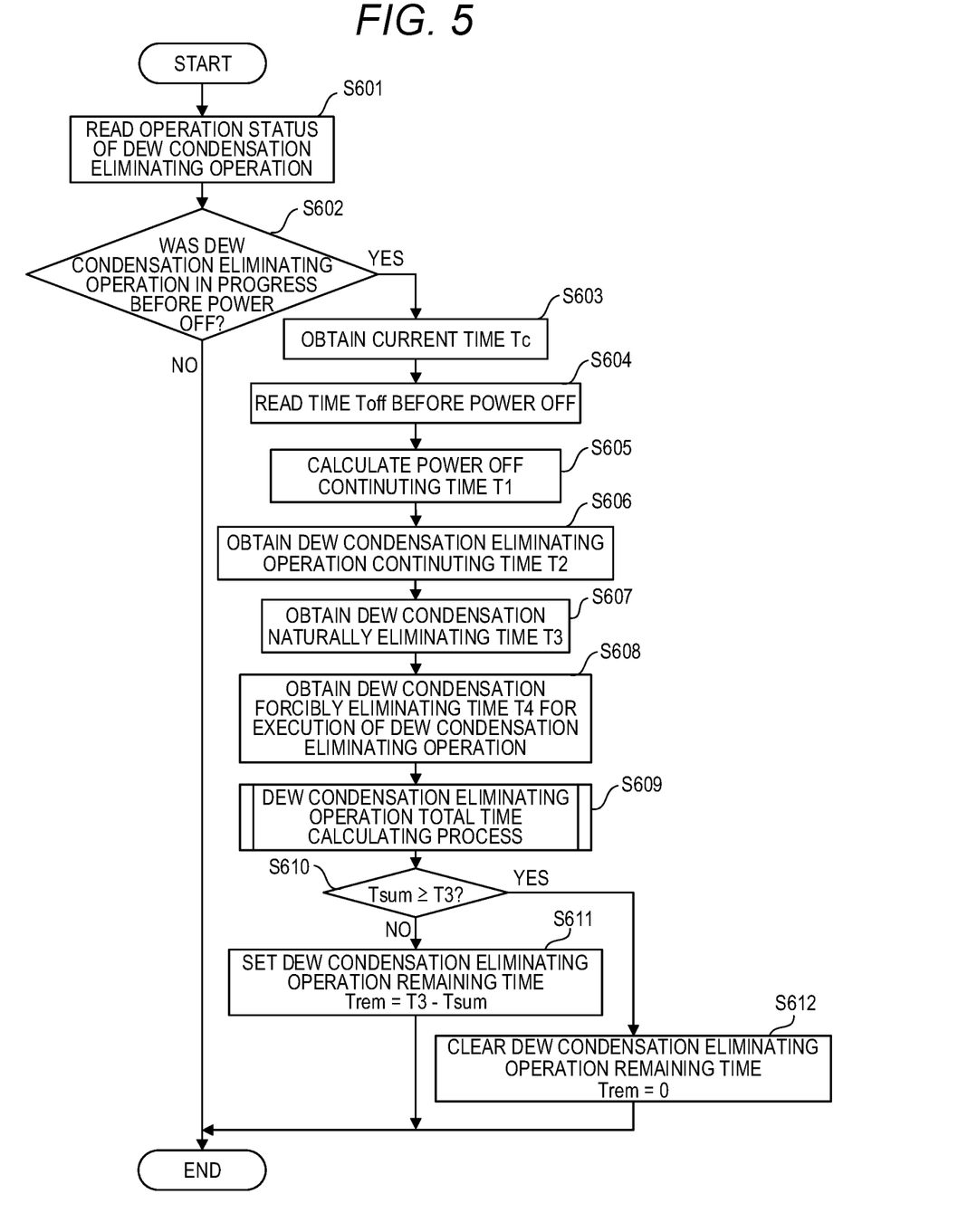
FIG. 5 is a flow chart of a dew condensation eliminating operation continuation determination process, which is executed by the CPU.
Figure 6:
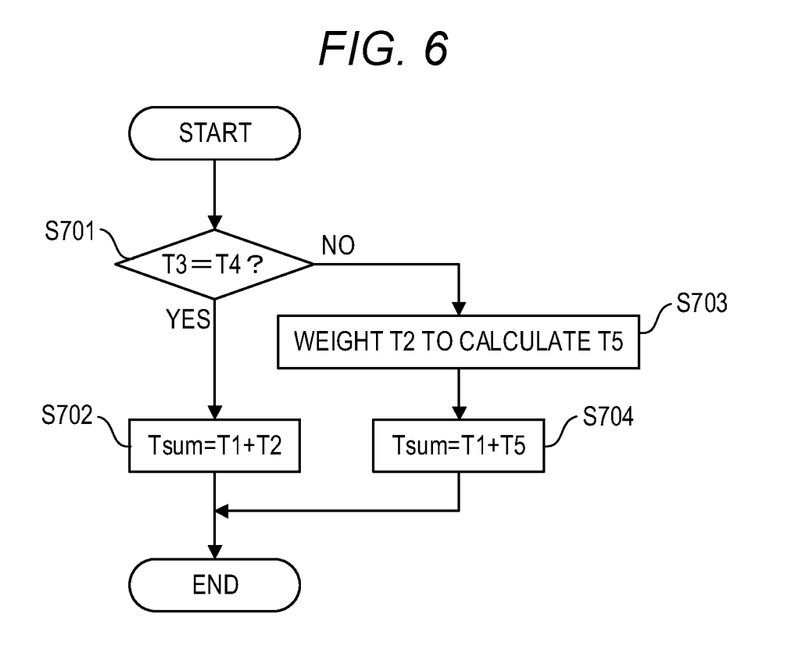
FIG. 6 is a flow chart of a dew condensation eliminating operation total time calculating process, which is executed by the CPU.
Figure 7:
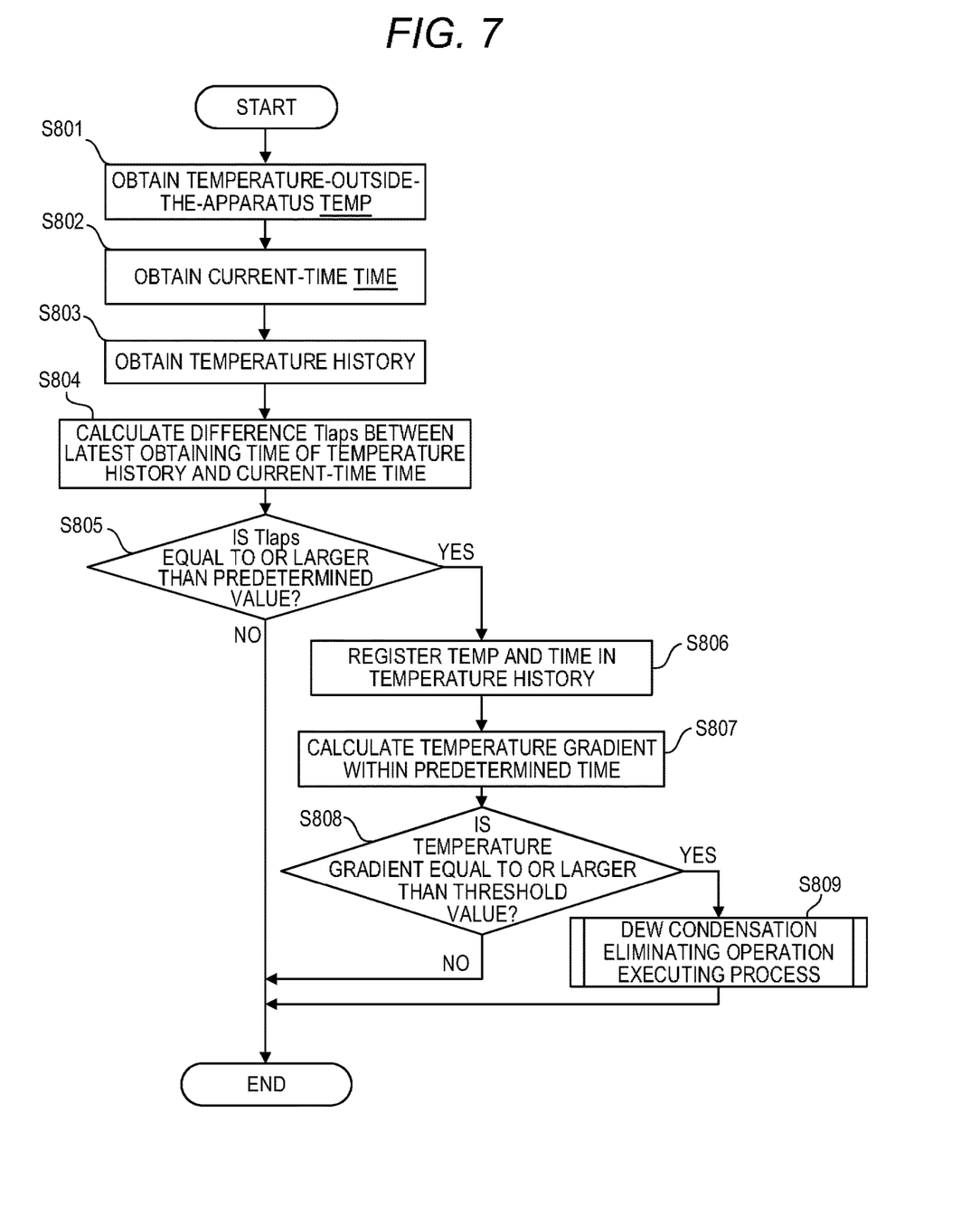
FIG. 7 is a flow chart of temperature monitoring control, which is executed by the CPU.

Next, referring to FIG. 5, FIG. 6, FIG. 7, and FIG. 8, a subroutine to be executed by the CPU 301 is described. FIG. 5 and FIG. 6 are flow charts for illustrating the dew condensation eliminating operation continuation determination process to be executed by the CPU 301. The dew condensation eliminating operation continuation determination process is a process of determining, when the power supply to the image forming apparatus 100 is stopped (turned OFF) during the execution of the dew condensation eliminating operation and then the power supply to the image forming apparatus 100 is started (turned ON), whether or not the remaining dew condensation eliminating operation is to be executed (continued). The dew condensation eliminating operation continuation determination process corresponds to the process in Step S502 of FIG. 4. FIG. 7 is a flow chart for illustrating the temperature monitoring control to be executed by the CPU 301. The temperature monitoring control is control under which a temperature-outside-the-apparatus is periodically obtained and a temperature gradient thereof is calculated to allow whether or not dew condensation has occurred to be determined. The temperature monitoring control corresponds to the process in Step S505 of FIG. 4.

<Dew Condensation Eliminating Operation Continuation Determination Process>

Referring to FIG. 5, the dew condensation eliminating operation continuation determination process is described. FIG. 5 is a flow chart of the dew condensation eliminating operation continuation determination process to be executed by the CPU 301. When the dew condensation eliminating operation continuation determination process is started, the CPU 301 reads the operation status of the dew condensation eliminating operation immediately before the power OFF (Step S601) which is stored in the nonvolatile memory 313. The operation status of the dew condensation eliminating operation immediately before the power OFF is stored in the nonvolatile memory 313 immediately before the power supply to the CPU 301 was stopped in Step S510 of FIG. 4 described above. The CPU 301 determines, based on the operation status read from the nonvolatile memory 313, whether or not the dew condensation eliminating operation was in progress before the power OFF (Step S602). When the dew condensation eliminating operation was not in progress before the power OFF (NO in Step S602), the CPU 301 ends the dew condensation eliminating operation continuation determination process.

When the dew condensation eliminating operation was in progress before the power OFF (YES in Step S602), the CPU 301 obtains a current time (restart time) Tc from the timer 310 (Step S603). The CPU 301 obtains the time (stop time) Toff before the power OFF, which is stored in the nonvolatile memory 313 (Step S604). The CPU 301 compares the current time Tc obtained in Step S603 with the time Toff before the power OFF obtained in Step S604 to calculate a power OFF continuing time (power supply stop continuing time) T1 (Step S605). The power OFF continuing time T1 represents a time period elapsed from a time when the power supply is turned OFF to a time when the power supply is turned ON next time. Specifically, the power OFF continuing time T1 may also be determined from, for example, a difference (Tc-Toff) between the current time Tc and the time Toff before the power OFF.

The CPU 301 obtains, from the nonvolatile memory 313, the dew condensation eliminating operation continuing time T2 representing an execution time of the dew condensation eliminating operation that was executed before the power OFF (Step S606). The CPU 301 obtains, from the ROM 303, a dew condensation naturally eliminating time T3 when dew condensation has occurred (Step S607). The CPU 301 obtains, from the ROM 303, a dew condensation forcibly eliminating time T4 when dew condensation has occurred and the dew condensation eliminating operation is executed (Step S608). The dew condensation eliminating operation is an operation to be executed by the CPU 301 in order to eliminate dew condensation that has occurred in the image forming apparatus 100. The dew condensation naturally eliminating time T3 is a time required to allow dew condensation to be naturally eliminated without involving execution of the dew condensation eliminating operation, and is stored in advance in the ROM 303. The dew condensation forcibly eliminating time T4 is a time required to eliminate dew condensation through execution of the dew condensation eliminating operation, and is stored in advance in the ROM 303. In at least one embodiment, the fan 322 is used as an example of a dew condensation eliminating operation execution unit configured to execute the dew condensation eliminating operation for eliminating dew condensation that has occurred in an interior of the image forming apparatus 100. The fan 322 is an environment uniformization unit configured to form an air flow in the image forming apparatus 100, to thereby uniformize an environment in the image forming apparatus 100. The dew condensation eliminating operation execution unit is not limited to the fan 322, and may also execute the dew condensation eliminating operation involving switching to a memory receiving function of storing facsimile data (FAX data) received from the FAX transceiver 314 in the non-volatile memory 313. The dew condensation eliminating operation execution unit may also execute the dew condensation eliminating operation in which the air flow is switched as a result of driving by an actuator, for example, the motor 321. The dew condensation eliminating operation execution unit may also execute the dew condensation eliminating operation in which the turning ON of the heater 323 is controlled. The heater 323 is the environment uniformization unit configured to adjust a temperature in the image forming apparatus 100, to thereby uniformize the environment in the interior of the image forming apparatus 100.

The CPU 301 executes a dew condensation eliminating operation total time calculating process through use of the power OFF continuing time T1, the dew condensation eliminating operation continuing time T2, the dew condensation naturally eliminating time T3, and the dew condensation forcibly eliminating time T4 (Step S609). In the dew condensation eliminating operation total time calculating process, the CPU 301 calculates a dew condensation eliminating operation total time Tsum of the dew condensation eliminating operation executed hitherto. The details of the dew condensation eliminating operation total time calculating process are described later. The CPU 301 determines whether or not the dew condensation eliminating operation total time Tsum calculated in Step S609 is equal to or longer than the dew condensation naturally eliminating time T3 (Step S610). When the dew condensation eliminating operation total time Tsum is shorter than the dew condensation naturally eliminating time T3, it is determined that a time period sufficient to eliminate dew condensation has not elapsed from the time when the power supply was turned OFF. Accordingly, when the dew condensation eliminating operation total time Tsum is shorter than the dew condensation naturally eliminating time T3 (NO in Step S610), the CPU 301 calculates the dew condensation eliminating operation remaining time Trem as a remaining time of the dew condensation eliminating operation that was stopped midway (Step S611). The dew condensation eliminating operation remaining time Trem is calculated from a difference between the dew condensation naturally eliminating time T3 and the dew condensation eliminating operation total time Tsum. The CPU 301 stores the dew condensation eliminating operation remaining time Trem in the RAM 302. The CPU 301 executes, in Step S504 in FIG. 4, the dew condensation eliminating operation based on the dew condensation eliminating operation remaining time Trem. Meanwhile, when the dew condensation eliminating operation total time Tsum is equal to or longer than the dew condensation naturally eliminating time T3, it is determined that a time period sufficient to eliminate dew condensation has elapsed from the time when the power supply was turned OFF. Accordingly, when the dew condensation eliminating operation total time Tsum is equal to or longer than the dew condensation naturally eliminating time T3 (YES in Step S610), the CPU 301 clears the dew condensation eliminating operation remaining time Trem to set the dew condensation eliminating operation remaining time Trem to 0 (Step S612).

<Dew Condensation Eliminating Operation Total Time Calculating Process>

Next, referring to FIG. 6, description is given of the dew condensation eliminating operation total time calculating process, which is executed in Step S609 of the dew condensation eliminating operation continuation determination process illustrated in FIG. 5. FIG. 6 is a flow chart of the dew condensation eliminating operation total time calculating process to be executed by the CPU 301. When the dew condensation eliminating operation total time calculating process is started, the CPU 301 determines whether or not the dew condensation naturally eliminating time T3 when dew condensation has occurred is equal to the dew condensation forcibly eliminating time T4, during which the dew condensation eliminating operation is executed (Step S701). When the dew condensation naturally eliminating time T3 is equal to the dew condensation forcibly eliminating time T4, even when the dew condensation eliminating operation is executed in the image forming apparatus 100, a time period required to execute the dew condensation eliminating operation in order to eliminate the dew condensation is not shorter than a time period required to naturally eliminate the dew condensation. In this case, a degree of contribution made by dew condensation natural elimination to dew condensation elimination while the power supply is OFF is equal to a degree of contribution made by the execution of the dew condensation eliminating operation to the dew condensation elimination. Accordingly, when the dew condensation naturally eliminating time T3 is equal to the dew condensation forcibly eliminating time T4 (YES in Step S701), the CPU 301 calculates, as a value of the dew condensation eliminating operation total time Tsum, a total value of the power OFF continuing time T1 and the dew condensation eliminating operation continuing time T2 before the power OFF (Step S702). In other words, when the dew condensation naturally eliminating time T3 is equal to the dew condensation forcibly eliminating time T4, the dew condensation eliminating operation total time Tsum is calculated based on Tsum=T1+T2.

Meanwhile, when the dew condensation naturally eliminating time T3 is different from the dew condensation forcibly eliminating time T4, the degree of the contribution made by the dew condensation natural elimination to the dew condensation elimination while the power supply is OFF is different from the degree of the contribution made by the execution of the dew condensation eliminating operation to the dew condensation elimination. Accordingly, when the dew condensation naturally eliminating time T3 is different from the dew condensation forcibly eliminating time T4 (NO in Step S701), the CPU 301 weights the dew condensation eliminating operation continuing time T2 to calculate a corrected dew condensation eliminating operation continuing time (corrected execution time) T5 (Step S703). Specifically, the CPU 301 weights the dew condensation eliminating operation continuing time T2 based on a ratio between the dew condensation naturally eliminating time T3 and the dew condensation forcibly eliminating time T4 to calculate the corrected dew condensation eliminating operation continuing time T5. The corrected dew condensation eliminating operation continuing time T5 is calculated based on Expression (1) given below.

$$T5=T2\times(T3/T4) \tag{1}$$

The CPU 301 calculates, as the dew condensation eliminating operation total time Tsum, a total value of the power OFF continuing time T1 and the corrected dew condensation eliminating operation continuing time T5 calculated through the weighting of the dew condensation eliminating operation continuing time T2 in Step S703 (Step S704). Specifically, when the dew condensation naturally eliminating time T3 is different from the dew condensation forcibly eliminating time T4, the dew condensation eliminating operation total time Tsum is calculated based on Tsum=T1+T5. Then, the CPU 301 ends the dew condensation eliminating operation total time calculating process.

<Temperature Monitoring Control>

Next, referring to FIG. 7, the temperature monitoring control, which is executed in Step S505 of FIG. 4, is described. The temperature monitoring control is a process of periodically monitoring a temperature outside the image forming apparatus 100 (hereinafter referred to as "temperature-outside-the-apparatus") to obtain a temperature gradient within a predetermined time period and determining whether or not the dew condensation eliminating operation is required (whether or not dew condensation has occurred). FIG. 7 is a flow chart of the temperature monitoring control to be executed by the CPU 301.

When the temperature monitoring control is started, the CPU 301 obtains a temperature-outside-the-apparatus (detection result) TEMP detected by the temperature sensor 309 (Step S801). The CPU 301 obtains a current-time TIME from the timer 310 (Step S802). A temperature history including temperature information obtained hitherto and times when the temperature information was obtained is stored in the RAM 302. The CPU 301 obtains the temperature history from the RAM 302 (Step S803). The CPU 301 refers to a latest obtaining time in the temperature history obtained in Step S803 and calculates a difference Tlaps, which is a difference between the current-time TIME obtained in Step S802 and the latest obtaining time (Step S804). The CPU 301 determines whether or not the difference Tlaps is equal to or larger than a predetermined value (Step S805). When the difference Tlaps is smaller than the predetermined value, an update interval for the temperature history is excessively short. Accordingly, when the difference Tlaps is smaller than the predetermined value (NO in Step S805), the CPU 301 ends the temperature monitoring control. Meanwhile, when the difference Tlaps is equal to or larger than the predetermined value, the update interval is sufficient. Accordingly, when the difference Tlaps is equal to or larger than the predetermined value (YES in Step S805), the CPU 301 continues the temperature monitoring control to advance the process of the temperature monitoring control to Step S806.

The CPU 301 registers, in the temperature history obtained in Step S803, the temperature-outside-the-apparatus TEMP obtained in Step S801 and the current-time TIME obtained in Step S802 (Step S806). The CPU 301 calculates the temperature gradient within a predetermined time period before a time at which the temperature-outside-the-apparatus registered in the temperature history was last obtained, through use of a temperature-outside-the-apparatus during the predetermined time period (Step S807). The CPU 301 determines whether or not the temperature gradient is equal to or larger than a threshold set in advance (Step S808). When the temperature gradient is smaller than the threshold, dew condensation does not occur. Accordingly, when the temperature gradient is smaller than the threshold (NO in Step S808), the CPU 301 ends the temperature monitoring control. Meanwhile, when the temperature gradient is equal to or larger than the threshold (YES in Step S808), the CPU 301 executes the dew condensation eliminating operation execution process (Step S809). After the dew condensation eliminating operation execution process, the CPU 301 ends the temperature monitoring control.

<Dew Condensation Eliminating Operation Execution Process>

Figure 8:
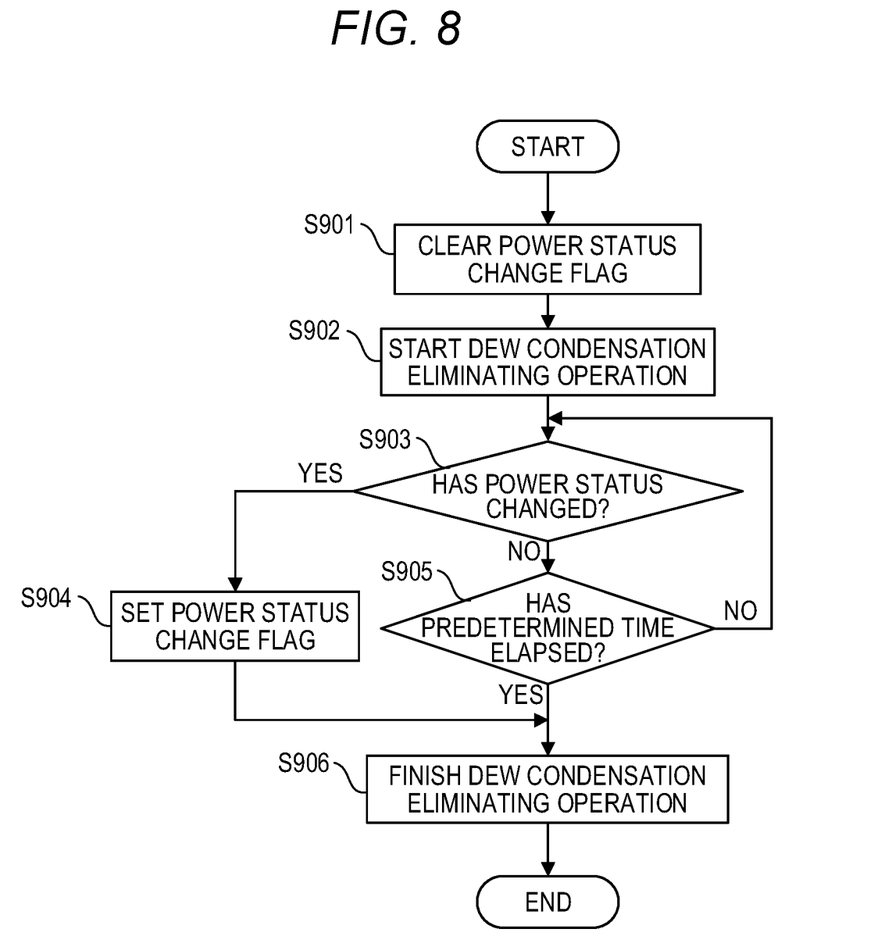
FIG. 8 is a flow chart of a dew condensation eliminating operation execution process, which is executed by the CPU.

Next, referring to FIG. 8, the dew condensation eliminating operation execution process is described. FIG. 8 is a flow chart of the dew condensation eliminating operation execution process to be executed by the CPU 301. The dew condensation eliminating operation execution process is a process to be executed, when it is determined that dew condensation has occurred in the image forming apparatus 100, in order to eliminate the dew condensation. The dew condensation eliminating operation execution process corresponds to each of the process in Step S504 of FIG. 4 and the process in Step S809 of FIG. 7. When the dew condensation eliminating operation execution process is started, the CPU 301 clears the power status change flag representing that any change has occurred in a power status and it is required to turn OFF the power supply (Step S901). The CPU 301 starts the dew condensation eliminating operation (Step S902). During the execution of the dew condensation eliminating operation, the CPU 301 determines whether or not any change has occurred in the power status and it is required to turn OFF the power supply (Step S903). Examples of a case in which any change has occurred in the power status and it is required to turn OFF the power supply include a case in which an instantaneous blacked-out state is caused and a voltage drop is detected in the power controller 304 and a case in which a request to turn OFF the power supply is received from the console unit 305. When it is determined that any change has occurred in the power status and it is required to turn OFF the power supply (YES in Step S903), the CPU 301 sets the power status change flag (Step S904). The CPU 301 ends the dew condensation eliminating operation (Step S906), and ends the dew condensation eliminating operation execution process. Meanwhile, when there is no change in the power status (NO in Step S903), the CPU 301 determines whether or not the execution time of the dew condensation eliminating operation has exceeded a predetermined time (Step S905). The predetermined time mentioned herein is the dew condensation eliminating operation remaining time Trem when the dew condensation eliminating operation execution process is called in Step S504 in FIG. 4. The predetermined time mentioned herein is the dew condensation forcibly eliminating time T4 when the dew condensation eliminating operation execution process is called in Step S809 of FIG. 7. When the execution time of the dew condensation eliminating operation has not exceeded the predetermined time (NO in Step S905), the CPU 301 returns the dew condensation eliminating operation execution process to Step S903 and continues the dew condensation eliminating operation. When the execution time of the dew condensation eliminating operation has exceeded the predetermined time (YES in Step S905), the CPU 301 ends the dew condensation eliminating operation (Step S906), and ends the dew condensation eliminating operation execution process.

<Comparison with Conventional Art Example>

In the following, description is given of a comparison between a conventional example and each of Example 1, Example 2, and Example 3 in at least one embodiment. FIG. 9A, FIG. 9B, FIG. 9C, and FIG. 9D are diagrams for illustrating respective operations to be executed in the conventional example and Example 1, Example 2, and Example 3 in at least one embodiment. In FIG. 9A, FIG. 9B, FIG. 9C, and FIG. 9D, Step S1001, Step S1002, Step S1003, and Step S1004 represent events, and Step S1005, Step S1006, Step S1007, Step S1008, Step S1009, and Step S1010 represent statuses of the image forming apparatus 100. The events and the statuses of the image forming apparatus 100 are described later.

CONVENTIONAL EXAMPLE

Figure 9A:
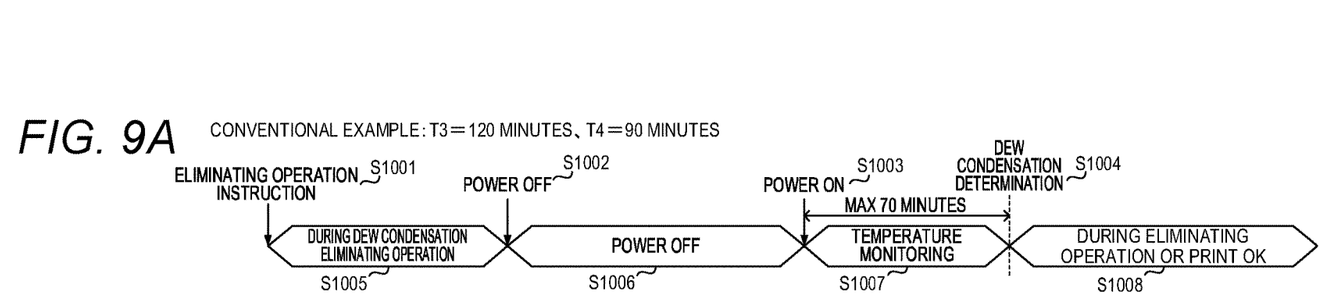
FIG. 9A, FIG. 9B, FIG. 9C and FIG. 9D are diagrams for illustrating respective operations to be executed in a conventional example and Example 1, Example 2, and Example 3 in the embodiment.

First, referring to FIG. 9A, the operation to be executed in the conventional example is described. FIG. 9A is a diagram for illustrating the operation to be executed in the conventional example to which at least one embodiment is not applied. In the conventional example, the dew condensation naturally eliminating time T3, during which the dew condensation eliminating operation is not executed, is set to 120 minutes, and the dew condensation forcibly eliminating time T4, during which the dew condensation eliminating operation is executed, is set to 90 minutes. When the CPU 301 gives a dew condensation eliminating operation instruction (Step S1001), the image forming apparatus 100 shifts to a state during the dew condensation eliminating operation for executing a predetermined dew condensation eliminating operation (Step S1005). When the CPU 301 detects the power OFF during the dew condensation eliminating operation as a result of an operation performed by the user, for example (Step S1002), the CPU 301 stops the power supply to the image forming apparatus 100, and the image forming apparatus 100 shifts to the power OFF state, in which the power supply is cut off (Step S1006). Subsequently, when the power supply to the CPU 301 is turned ON by the power ON (Step S1003), in the conventional example, the dew condensation eliminating operation continuation determination process is not executed after the power ON, and the image forming apparatus 100 shifts to a temperature monitoring state, in which the temperature monitoring control described above with reference to FIG. 7 is performed (Step S1007). It is assumed herein that, by way of example, the temperature gradient calculated under the temperature monitoring control is determined from the temperature history (data) within a predetermined time period of 70 minutes. Accordingly, after the power ON (Step S1003), a maximum of 70 minutes is required before it is determined under the temperature monitoring control whether or not the dew condensation eliminating operation is required to be executed. When the temperature monitoring control is ended, the CPU 301 determines whether or not dew condensation has occurred, and executes the dew condensation eliminating operation when dew condensation has occurred (Step S1008). However, under a state during the temperature monitoring (Step S1007), the CPU 301 cannot determine that dew condensation has occurred, and consequently the image forming apparatus 100 shifts to a state in which a print job can be received. As a result, when dew condensation has actually occurred, maintaining image quality may be impossible.

Example 1

Figure 9B:
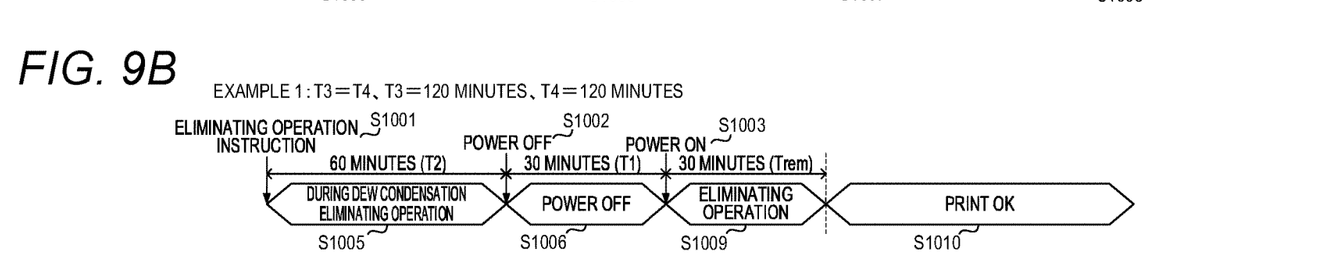

Next, referring to FIG. 9B, the operation to be executed in Example 1 in at least one embodiment is described. FIG. 9B is a diagram for illustrating the operation to be executed in Example 1 in at least one embodiment. In Example 1, the dew condensation naturally eliminating time T3 is equal to the dew condensation forcibly eliminating time T4, and each of the dew condensation naturally eliminating time T3 and the dew condensation forcibly eliminating time T4 is set to 120 minutes. When the CPU 301 gives the dew condensation eliminating operation instruction (Step S1001), the image forming apparatus 100 shifts to a state during the dew condensation eliminating operation (Step S1005). When the CPU 301 detects, after a lapse of 60 minutes from the start of the dew condensation eliminating operation, the power OFF during the dew condensation eliminating operation as a result of an operation performed by the user, for example (Step S1002), the image forming apparatus 100 shifts to the power OFF state (Step S1006). Accordingly, in Example 1, the dew condensation eliminating operation continuing time T2 before the power OFF is 60 minutes. When the power supply to the CPU 301 is turned ON by the power ON (Step S1003) after a lapse of 30 minutes from when the power supply was turned OFF, the CPU 301 executes the dew condensation eliminating operation continuation determination process. Accordingly, in Example 1, the power OFF continuing time T1 is 30 minutes.

In Example 1, the dew condensation naturally eliminating time T3 is equal to the dew condensation forcibly eliminating time T4, during which the dew condensation eliminating operation is executed. Accordingly, the dew condensation eliminating operation remaining time Trem is calculated based on Expression (2) given below.

$$Trem=T3-(T2+T1) \qquad (2)$$

When the values are substituted into Expression (2), Trem=120−(60+30)=30 is satisfied, and consequently the dew condensation eliminating operation remaining time Trem is 30 minutes. In Example 1, the CPU 301 is required to execute the dew condensation eliminating operation for only 30 minutes from the time when the power supply was turned ON. As illustrated in FIG. 9B, under the state during the dew condensation eliminating operation (Step S1009) after the power ON (Step S1003), the dew condensation eliminating operation is executed for 30 minutes corresponding to the dew condensation eliminating operation remaining time Trem. Then, the image forming apparatus 100 shifts to a print OK (Step S1010) state. By the dew condensation eliminating operation, the dew condensation has been eliminated, and hence the image forming apparatus 100 can normally execute a print job. While, in the conventional example, there is a period during which it is uncertain whether or not the image quality is degraded by dew condensation, Example 1 can eliminate such a period. In Example 1, a case in which the dew condensation eliminating operation remaining time Trem is longer than 0 is described. However, in a case in which the power OFF continuing time T1 is sufficiently long, that is, a case in which a value given by T3−(T2+T1) is equal to or shorter than 0, the dew condensation eliminating operation remaining time Trem is set to 0.

Example 2

Figure 9C:
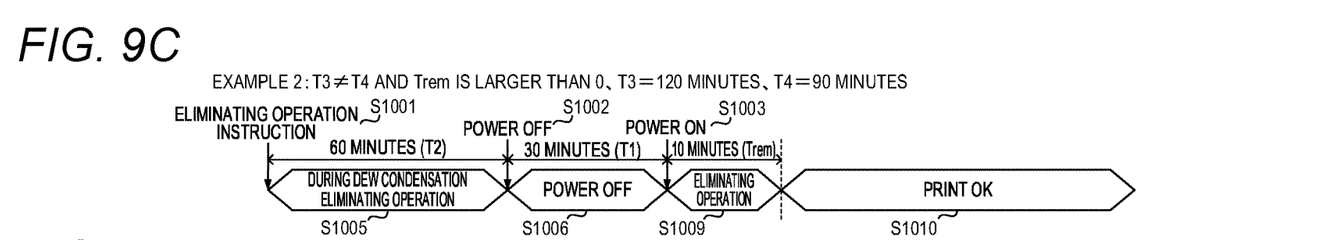

Next, referring to FIG. 9C, the operation to be executed in Example 2 in at least one embodiment is described. FIG. 9C is a diagram for illustrating the operation to be executed in Example 2 in at least one embodiment. In Example 2, the dew condensation naturally eliminating time T3 is different from the dew condensation forcibly eliminating time T4. Specifically, the dew condensation naturally eliminating time T3 is set to 120 minutes, and the dew condensation forcibly eliminating time T4 is set to 90 minutes. In Example 2, a case in which the dew condensation eliminating operation remaining time Trem is longer than 0 is described. When the CPU 301 gives the dew condensation eliminating operation instruction (Step S1001), the image forming apparatus 100 shifts to the state during the dew condensation eliminating operation (Step S1005). In Example 2, the dew condensation eliminating operation continuing time T2 before the power OFF is 60 minutes, which is similar to that in Example 1, and the power OFF continuing time T1 is also 30 minutes, which is similar to that in Example 1.

In Example 2, the dew condensation naturally eliminating time T3 is different from the dew condensation forcibly eliminating time T4, during which the dew condensation eliminating operation is executed. Accordingly, the dew condensation eliminating operation remaining time Trem is calculated based on Expression (3) given below.

$$Trem = T3 - (T5 + T1) \qquad (3)$$

The corrected dew condensation eliminating operation continuing time T5 is 80 minutes based on $T5 = 60 \times (120/90) = 80$, which is obtained by substituting the values into Expression (1). When the values are substituted in Expression (3), $Trem = 120 - (80 + 30) = 10$ is satisfied, and hence the dew condensation eliminating operation remaining time Trem is 10 minutes. Accordingly, the CPU 301 is required to execute the dew condensation eliminating operation for only 10 minutes from a time when the power supply was turned ON. In a case in which the dew condensation naturally eliminating time T3 is different from the dew condensation forcibly eliminating time T4 as in Example 2, compared with a case in which the dew condensation naturally eliminating time T3 is equal to the dew condensation forcibly eliminating time T4 as in Example 1, a time period during which the dew condensation eliminating operation is executed after the power ON is reduced. As illustrated in FIG. 9C, under a state during the dew condensation eliminating operation (Step S1009) after the power ON (Step S1003), the dew condensation eliminating operation is executed for 10 minutes corresponding to the dew condensation eliminating operation remaining time Trem. Subsequently, the image forming apparatus 100 shifts to the print OK (Step S1010) state. By the dew condensation eliminating operation, the dew condensation has been eliminated, and hence the image forming apparatus 100 can normally execute a print job. Therefore, according to Example 2, in the same manner as in Example 1, it is possible to eliminate the period during which it is uncertain whether or not the image quality is degraded by dew condensation.

Example 3

Figure 9D:
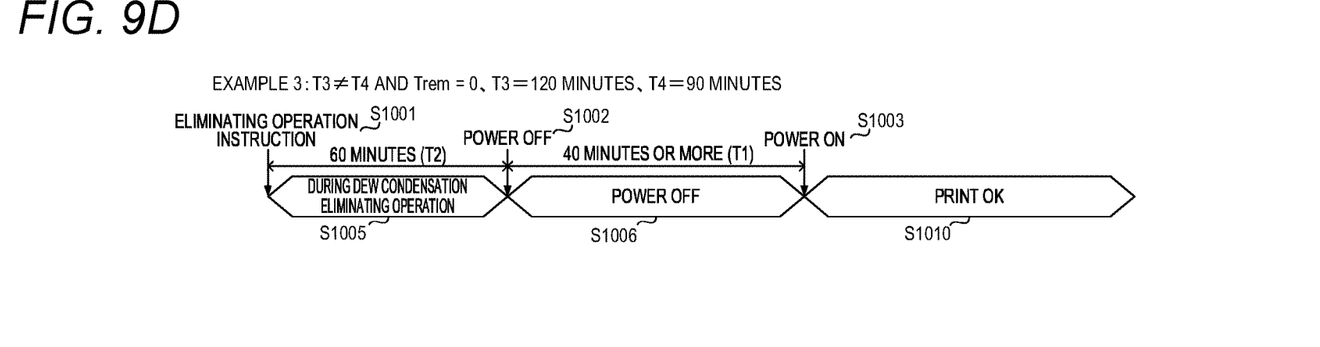

Next, referring to FIG. 9D, the operation to be executed in Example 3 in at least one embodiment is described. FIG. 9D is a diagram for illustrating the operation to be executed in Example 3 in at least one embodiment. In Example 3, like in Example 2, the dew condensation naturally eliminating time T3 is different from the dew condensation forcibly eliminating time T4. Specifically, the dew condensation naturally eliminating time T3 is set to 120 minutes, and the dew condensation forcibly eliminating time T4 is set to 90 minutes. However, in Example 3, unlike in Example 2, a case in which the dew condensation eliminating operation remaining time Trem is 0 is described. In other words, while the dew condensation eliminating operation is required after the power ON in each of Example 1 and Example 2, the dew condensation eliminating operation is not required after the power ON in Example 3. When the CPU 301 gives the dew condensation eliminating operation instruction (Step S1001), the image forming apparatus 100 shifts to the state during the dew condensation eliminating operation (Step S1005). In Example 3, the dew condensation eliminating operation continuing time T2 before the power OFF is 60 minutes, which is similar to that in Example 1. However, the power OFF continuing time T1 is equal to or longer than 40 minutes, which is longer than in Example 2.

In Example 3, the corrected dew condensation eliminating operation continuing time T5 is 80 minutes, which is similar to that in Example 2, while the power OFF continuing time T1 is equal to or longer than 40 minutes, which is longer than that in Example 2. Accordingly, when the values are substituted into Expression (3) on the assumption that the power OFF continuing time T1 is, for example, 40 minutes, $Trem = 120 - (80 + 40) = 0$ is satisfied, and consequently the dew condensation eliminating operation remaining time Trem is 0 minutes. Therefore, it is determined that the dew condensation in the image forming apparatus 100 has been already eliminated. The CPU 301 is not required to execute the dew condensation eliminating operation after the power supply was turned ON. As illustrated in FIG. 9D, the image forming apparatus 100 immediately shifts to the print OK (Step S1010) state without executing the dew condensation eliminating operation after the power ON (Step S1003). The dew condensation has been already eliminated, and hence the image forming apparatus 100 can normally execute the print job. Therefore, according to Example 3, in the same manner as in Example 1 and Example 2, it is possible to eliminate the period during which it is uncertain whether or not the image quality is degraded by dew condensation.

According to at least one embodiment, even when the power supply to the image forming apparatus 100 is turned OFF/ON during the dew condensation eliminating operation, it is possible to determine whether or not the dew condensation eliminating operation is required to be continued after the power ON based on the execution time of the dew condensation eliminating operation executed before the power OFF and on the power OFF continuing time. When it is required to continue the dew condensation eliminating operation based on a result of the determination, the dew condensation eliminating operation is continued. This allows determination of whether or not the dew condensation eliminating operation is required after the power ON without the need for an additional sensor or the like. According to at least one embodiment, even when the power supply is turned OFF during the dew condensation eliminating operation, the dew condensation eliminating operation can be executed for a required time period when the power supply is turned ON next time. Consequently, it is possible to eliminate the time period during which it is uncertain whether or not the image quality is degraded by dew condensation immediately after the power ON. According to at least one embodiment, it can be determined whether or not the dew condensation eliminating operation is to be executed when the power supply to the image forming apparatus 100 is started.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-130941, filed Jul. 10, 2018, which is hereby incorporated by reference herein in its entirety.

What is claimed is:

1. An image forming apparatus comprising:
   an image forming portion configured to form an image on a recording medium;
   a temperature detecting unit configured to detect a temperature outside the image forming apparatus;

a nonvolatile storage portion configured to store data; and a control unit configured to perform control to execute a dew condensation eliminating operation for eliminating dew condensation which has occurred in an interior of the image forming apparatus based on a detection result of the temperature detecting unit, wherein, when a power supply to the image forming apparatus is stopped during an execution of the dew condensation eliminating operation, the control unit stores an execution time of the dew condensation eliminating operation which has been executed when the power supply is stopped in the nonvolatile storage portion, and wherein, when the power supply to the image forming apparatus is started after the power supply to the image forming apparatus is stopped during the execution of the dew condensation eliminating operation, the control unit determines whether or not to execute the dew condensation eliminating operation based on the execution time and a power supply stop continuing time from a time when the power supply to the image forming apparatus is stopped during the execution of the dew condensation eliminating operation to a time when the power supply to the image forming apparatus is started.

2. The image forming apparatus according to claim 1, further comprising a facsimile transmitting and receiving unit, wherein the control unit is configured to execute, as the dew condensation eliminating operation, an operation of storing data received from the facsimile transmitting and receiving unit in the nonvolatile storage portion.

3. The image forming apparatus according to claim 1, further comprising an environment uniformization unit configured to uniformize an environment in the interior of the image forming apparatus, wherein the control unit is configured to execute, as the dew condensation eliminating operation, an operation of driving the environment uniformization unit.

4. The image forming apparatus according to claim 1, wherein the control unit is configured to determine whether or not to execute the dew condensation eliminating operation based on a total value of the execution time and the power supply stop continuing time.

5. The image forming apparatus according to claim 1, wherein the control unit is configured to weight the execution time to calculate a corrected execution time, and wherein the control unit is configured to determine whether or not to execute the dew condensation eliminating operation based on a total value of the corrected execution time and the power supply stop continuing time.

6. The image forming apparatus according to claim 5, wherein the nonvolatile storage portion stores:

a dew condensation naturally eliminating time required to naturally eliminate the dew condensation without executing the dew condensation eliminating operation; and a dew condensation forcibly eliminating time required to eliminate the dew condensation by the execution of the dew condensation eliminating operation, and wherein the control unit is configured to weight the execution time based on a ratio between the dew condensation naturally eliminating time and the dew condensation forcibly eliminating time to calculate the corrected execution time.

7. The image forming apparatus according to claim 1, further comprising a time obtaining unit configured to obtain a time, wherein the control unit is configured to calculate the execution time based on a start time obtained by the time obtaining unit when the dew condensation eliminating operation is started and a stop time obtained by the time obtaining unit when the power supply is stopped during the execution of the dew condensation eliminating operation.

8. The image forming apparatus according to claim 7, wherein the control unit is configured to store the execution time and the stop time in the nonvolatile storage portion when the power supply is stopped, and wherein the control unit is configured to calculate the power supply stop continuing time based on a restart time obtained by the time obtaining unit when the power supply is started and the stop time.

* * * * *